Patented Aug. 22, 1950

2,519,383

UNITED STATES PATENT OFFICE 2,519,383

THENYL ESTERS AND MITICIDE COMPOSITIONS CONTAINING THE SAME

Lucas P. Kyrides and Ferdinand B. Zienty, St. Louis, Mo., assignors to Monsanto Chemical Company, St. Louis, Mo., a corporation of Delaware No Drawing. Application October 30, 1946, Serial No. 706,810

17 Claims. (Cl. 167—33)

This invention relates to thenyl esters and particularly to 2-thenyl esters of monocarboxylic acids of the benzene series and to miticide compositions containing them.

One of the objects of the present invention is to provide novel thenyl esters.

Another object is to provide novel miticide compositions.

Other objects will become apparent from the following description and examples.

The novel esters of the present invention comprise the 2-thenyl esters of the monocarboxylic acids of the benzene series having the formula:

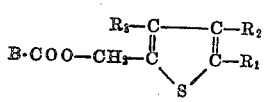

in which B is a substituted or unsubstituted benzene radical, $R_1$ is a radical selected from the group consisting of hydrogen, halogen, methyl, and ethyl radicals, and $R_2$ and $R_3$ each represent a radical selected from the group consisting of hydrogen, methyl, and ethyl radicals.

In addition to the unsubstituted benzene monocarboxylic acid residue in the esters of the present invention, the substituted benzene monocarboxylic residues, for example, those in which one or more radicals such as amino, nitro, halogen, hydroxyl, alkyl, alkenyl, aryl, and cycloalkyl radicals are present as substituents on the benzene ring are contemplated as being within the scope of the present invention. Illustrative of the 2-thenyl esters of the present invention are 2-thenyl benzoate, 2-thenyl salicylate, 5-methyl-2-thenyl benzoate, 4,5-dimethyl-2-thenyl benzoate, 5-chloro-2-thenyl benzoate, 5-bromo-2-theryl benzoate, 5-iodo-2-thenyl benzoate, 5-fluoro-2-thenyl benzoate, 4-methyl-5-bromo-2-thenyl benzoate, 4-octadecyl-5-bromo-2-thenyl benzoate, 4-methyl-5-tridecyl-2-thenyl benzoate, 2 - thenyl 3',5'-dinitro - benzoate, 5 - chloro-2-thenyl orthochloro-benzoate, 2-thenyl trichloro-benzoate, 2-thenyl paranitro-benzoate, 5-bromo-2-thenyl metanitro - benzoate, 4,5 - dimethyl-2-thenyl metanitro - benzoate, 2 - thenyl 3',4'-methylenedioxy-benzoate, 5-iodo-2-thenyl ortho-bromo-benzoate, 2-thenyl hexahydro-benzoate, 2-thenyl p-toluate, 2-thenyl gallate, 2-thenyl p-hydroxy-benzoate, 2-thenyl o-benzoyl-benzoate, 2-thenyl p-aminobenzoate.

In preparing the esters of the present invention, the monocarboxylic acid or an alkali metal salt thereof may be employed. Moreover, substituents on the benzene ring of the monocarboxylic acid may be effected, if desired, after the esterification is accomplished.

We have found that the thenyl esters may be prepared by heating a mixture of a 2-thenyl halide such as 2-thenyl chloride and an alkali-metal salt of the appropriate monocarboxylic acid, together with a small portion of a condensing agent, such as triethylamine or other tertiary aliphatic amines, at the temperature at which the two materials react exothermically. The 2-thenyl ester resulting from the reaction may be recovered from the reaction mixture by any desired procedure, for example, by washing the reaction product consecutively with dilute hydrochloric acid, dilute sodium bicarbonate solution, dilute sodium carbonate solution and water. The ester may be subsequently purified in some instances by distillation, preferably at reduced pressures, and in other instances by crystallization from a suitable solvent in which the ester is soluble.

We have also found that the thenyl esters may be prepared by heating together a mixture of a 2-thenyl alcohol and an acyl chloride or anhydride of the appropriate monocarboxylic acid in the presence of a suitable catalyst such as copper sulfate or benzene sulfonic acid. The reaction product may be recovered according to any desired procedure, for example the procedures hereinabove described.

The substituted 2-thenyl chlorides or 2-thenyl alcohols may be prepared by any desired procedure, for example, thiophene may be reacted with a halogen or a halide of a compound containing the desired radical for substitution of the thiophene and the resulting derivative may then be reacted with formaldehyde in the presence of hydrochloric acid and hydrogen chloride to further substitute the derivative in the 2-position with the chloromethyl radical. The resulting compound may then be reacted with an alkalimetal salt of the appropriate monocarboxylic acid according to the procedure hereinabove described. As an alternative, the substituted thenyl chloride may be subjected to a partial hydrolysis in which the chlorine atom on themethylene carbon in the 2-position on the thiophene residue may be removed and replaced with a hydroxy group to form the corresponding substituted thenyl alcohol. This alcohol may then be reacted with the acyl chloride of a monocarboxylic acid according to the alternative procedure hereinabove described.

The following examples will serve to illustrate the preparation of the novel compounds of the

Example I

To a mixture of 33.15 g. (0.25 mole) of 2-thenyl chloride and 0.33 g. of triethylamine heated to 65° C. was added 36.0 g. (0.25 mole) of sodium benzoate. The mixture was heated to a temperature in the range of 80—85° C. and maintained at that temperature for approximately one hour. The reaction mixture was then washed with dilute hydrochloric acid and subsequently washed in turn with dilute aqueous solutions of sodium carbonate and of sodium bicarbonate. The material was then washed with water and thereafter distilled to recover 2-thenyl benzoate. Yield, 93%; B. P. 148° C./3mm. Crystallization point 57° C. After recrystallization from methanol, with the aid of decolorizing charcoal, the ester melted at 58–59° C. (corrected).

Example II

To a mixture of 30.5 g. (0.25 mole) of benzoic acid and 0.5 g. of benzene sulfonic acid was added 28.5 g. (0.25 mole) of 2-thenyl alcohol. The reaction mixture was heated under slightly reduced pressure at a temperature in the range of 80–90° C. for approximately one hour. The reaction product was washed successively with dilute aqueous solutions of sodium bicarbonate and of sodium carbonate and therafter with water. The product was distilled to recover 2-thenyl benzoate.

Example III

To a mixture of 33.15 g. (0.25 mole) of thenyl chloride and 0.33 g. of triethylamine heated to 80° C. was added 40 g. (0.25 mole) of sodium salicylate. The mixture was heated to approximately 105° C., whereupon the exothermic reaction took place, the mixture became fluid and the temperature rose to 107–110° C. After approximately one-half hour the temperature began to drop. The mixture was heated for an additional hour at a temperature in the range of 98.5–105° C. and was thereafter washed consecutively with hot water, hot sodium bicarbonate-sodium carbonate solution and finally with hot water. The washings are desirably undertaken by refluxing the reaction mixture with the washing fluid and thereafter separating the product from the washed liquor. The washed reaction mixture was thereupon cooled to provide a granular product, filtered, washed with water and air dried. The product was dissolved in 200 g. of ethyl alcohol with the application of heat and the hot solution was treated with decolorizing charcoal and filtered hot. To the filtrate was added approximately 55 cc. of water and the solution was cooled to approximately 0° C. The material which crystallized from the solution was filtered off and air dried. Yield, 41.55 g. (71.0%) of 2-thenyl salicylate; M. P. 58.7–61.2° C.

Example IV

The 2-thenyl esters of 3,5-dinitro-benzoic acid, o-chloro-benzoic acid, trichloro-benzoic acid, p-nitro-benzoic acid, m-nitro-benzoic acid, gallic acid and p-hydroxy-benzoic acid, were prepared according to the method of Example I, using 0.25 mole of the sodium salt of the respective acids and 0.25 mole of thenyl chloride and heating the mixture in the presence of a small amount of triethylamine. In each instance, the esterification product obtained was a 2-thenyl ester of the corresponding acid employed in the esterification. The respective esters were mixed in the proportion of 0.5 lb. of the ester to 100 gallons of water and the mixture was sprayed on shrubs infested with red spiders. The compounds were found to be toxic to the red spiders.

The 2-thenyl monocarboxylic esters of the present invention such as 2-thenyl benzoate, 2-thenyl salicylate, or any of the esters hereinbefore mentioned, were found to be very effective in killing chiggers, red spiders and other mites and consituting very effective agents for use as active ingredients of miticide compositions applied to ornamental plants such as roses and snap dragons, agricultural plants and various shrubs and trees. The 2-thenyl esters of the present invention have also been found to be excellent insect repellents. There was no evidence of any appreciable injury to the plant foliage. The 2-thenyl esters of the present invention, for example, the benzoate, salicylate, or any of the esters hereinbefore mentioned, were found to be effective in the control of mites and larvae and eggs of mites at dilutions of 1:5000, 1:1000 and 1:2000 in acetone-water solutions. A number of the esters, for example 2-thenyl benzoate and 2-thenyl salicylate, were also found to possess antispasmodic action when tested on isolated rabbit intestine. The 2-thenyl esters, for example, 2-thenyl benzoate, 2-thenyl salicylate or any of the 2-thenyl esters hereinbefore mentioned, when tested were found to be substantially non-irritating when applied to the skin of animals.

For example, 2-thenyl salicylate was found to possess four times the antispasmodic action of benzyl benzoate when tested on isolated rabbit intestine for neurotropic action. 2-thenyl salicylate was also found to possess antispasmodic action when tested on isolated guinea pig intestine for musculotropic action. 2-thenyl salicylate was twice as effective as benzyl salicylate in this connection. 2-thenyl benzoate was found to have a relatively low order of toxicity in mice, the minimum lethal dose, $LD_{50}$, (oral) being 6.85 mg. per kg. This product was also found to be non-irritating. For example, a 10% ointment of 2-thenyl benzoate when applied to dehaired areas of rabbit's skin causes no irritation within a period of 48 hours.

While the 2-thenyl esters of the present invention have been found to be outstanding as miticides, these esters are also useful for other purposes such as in the field of plasticizers and as intermediates in the preparation of other compounds such as N-acyl ethylenediamines.

The 2-thenyl esters of the present invention may be compounded with other materials for the preparation of suitable miticide compositions. For example, the 2-thenyl esters may be mixed with inert finely divided materials such as pyrophyllite or bentonite and the composition thus formed may be applied as a dust to the mite infested shrubs or trees and to animals infested with mites. In compounding the dust, the 2-thenyl ester may be dissolved in a suitable solvent such as acetone or alcohol. The solution may then be mixed with bentonite or pyrophyllite and thereafter the solvent may be evaporated from the mixture. The 2-thenyl ester, for example, 2-thenyl benzoate, 2-thenyl salicylate, or any of the esters hereinbefore mentioned, may be compounded with a suitable oil such as summer oil, pine oil or white mineral oil and applied as an oil spray to the foilage of plants for the purpose of effecting mite control on the plants. Excellent results were obtained with this composition. Aqueous suspensions and emulsions of 2-thenyl esters may also be employed in combating mites. For example, 0.1-2 pounds of a 2-thenyl monocarboxylic acid ester of the present invention may be suspended in 100 gallons of water with agitation and the resulting mixture may then be sprayed on the plants. As an alternative, an aqueous emulsion of 0.1-2 pounds of a 2-thenyl monocarboxylic acid ester in 100 gallons of water together with 2 quarts of summer oil may be prepared. If desired, a wetting agent such as sodium dodecyl benzene sulfonate may be employed in the composition. The resulting aqueous emulsion may be sprayed on the plants for mite control.

Solutions of the 2-thenyl monocarboxylic acid esters such as 2-thenyl benzoate, 2-thenyl salicylate, or any of the esters hereinbefore mentioned, in suitable solvents, for example acetone, have been found useful for the impregnation of textiles, and particularly of articles of clothing, to provide insect repellency in such articles. Such articles thus treated have been found effectively conditioned against infestation from mites such as chiggers and lice and against insects. 2-thenyl benzoate and 2-thenyl salicylate were found to be better miticides than benzyl benzoate when applied to textiles. In laundering tests, 2-thenyl benzoate and 2-thenyl salicylate remained effective against mites through many more washings than did benzyl benzoate under the same circumstances.

While in the foregoing description and examples certain materials, proportions and conditions have been set forth, it is to be understood that these are merely illustrative of the invention and the invention is not to be construed as limiting to these materials, proportions and conditions except as defined in the claims.

We claim:
1. 2-thenyl esters of the formula type:

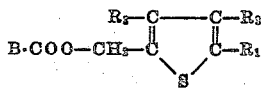

in which $B \cdot COO-$ is a monocarboxylic acid radical and B represents a phenyl radical, $R_1$ is a radical selected from the group consisting of hydrogen, halogen, methyl and ethyl radicals, and $R_2$ and $R_3$ each represent a radical selected from the group consisting of hydrogen, methyl and ethyl radicals.

2. 2-thenyl benzoate.
3. 2-thenyl salicylate.
4. 2-thenyl p-hydroxybenzoate.
5. A miticide composition comprising a mixture of a 2-thenyl ester of the formula type:

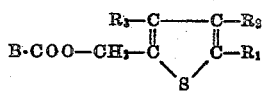

in which $B \cdot COO-$ is a monocarboxylic acid radical and B represents a phenyl radical, $R_1$ is a radical selected from the group consisting of hydrogen, halogen, methyl and ethyl radicals, and $R_2$ and $R_3$ each represent a radical selected from the group consisting of hydrogen, methyl and ethyl radicals, and a liquid diluent.

6. A miticide composition comprising a mixture of 0.1-2 parts by weight of a 2-thenyl ester of the formula type:

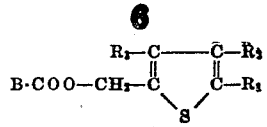

in which $B \cdot COO-$ is a monocarboxylic acid radical and B represents a phenyl radical, $R_1$ is a radical selected from the group consisting of hydrogen, halogen, methyl and ethyl radicals, and $R_2$ and $R_3$ each represent a radical selected from the group consisting of hydrogen, methyl and ethyl radicals, and 98-99.9 parts by weight of a finely divided solid inert diluent.

7. A miticide composition comprising an aqueous suspension having as its active ingredient a 2-thenyl ester of the formula type:

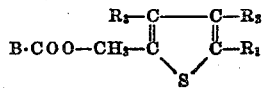

in which $B \cdot COO-$ is a monocarboxylic acid radical and B represents a phenyl radical, $R_1$ is a radical selected from the group consisting of hydrogen, halogen, methyl and ethyl radicals, and $R_2$ and $R_3$ each represent a radical selected from the group consisting of hydrogen, methyl and ethyl radicals.

8. A miticide composition comprising an aqueous emulsion of a 2-thenyl ester of the formula type:

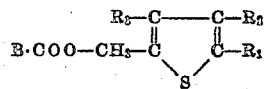

in which $B \cdot COO-$ is a monocarboxylic acid radical and B represents a phenyl radical, $R_1$ is a radical selected from the group consisting of hydrogen, halogen, methyl and ethyl radicals, and $R_2$ and $R_3$ each represent a radical selected from the group consisting of hydrogen, methyl and ethyl radicals, and a mineral oil.

9. A miticide composition comprising an aqueous emulsion of 0.1-2 parts of a 2-thenyl ester of the formula type:

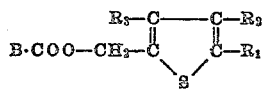

in which $B \cdot COO-$ is a monocarboxylic acid radical and B represents a phenyl radical, $R_1$ is a radical selected from the group consisting of hydrogen, halogen, methyl and ethyl radicals, and $R_2$ and $R_3$ each represent a radical selected from the group consisting of hydrogen, methyl and ethyl radicals, 2 quarts of summer oil and 100 gallons of water.

10. A miticide composition comprising an aqueous emulsion of 0.1-2 parts of a 2-thenyl ester of the formula type:

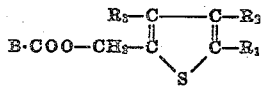

in which $B \cdot COO-$ is a monocarboxylic acid radical and B represents a phenyl radical, $R_1$ is a radical selected from the group consisting of hydrogen, halogen, methyl and ethyl radicals, and $R_2$ and $R_3$ each represent a radical selected from the group consisting of hydrogen, methyl and ethyl radicals, 2 quarts of summer oil, 100 gallons of water, and a wetting agent.

11. A miticide composition comprising a mixture of 0.1-2 parts by weight of 2-thenyl benzoate, and 98-99.9 parts by weight of a finely divided solid inert diluent.

12. A miticide composition comprising a mixture of 0.1-2 parts by weight of 2-thenyl salicylate, and 98-99.9 parts by weight of a finely divided solid inert diluent.

13. A miticide composition comprising an aqueous suspension having as its active ingredient 2-thenyl benzoate.

14. A miticide composition comprising an aqueous suspension having as its active ingredient 2-thenyl salicylate.

15. A miticide composition comprising an aqueous emulsion of 0.1-2 parts of 2-thenyl benzoate, 2 quarts of summer oil and 100 gallons of water.

16. A miticide composition comprising an aqueous emulsion of 0.1-2 parts of 2-thenyl salicylate, 2 quarts of summer oil and 100 gallons of water.

17. A miticide composition comprising an aqueous emulsion of 0.1-2 parts of 2-thenyl salicylate, 2 quarts of summer oil, 100 gallons of water, and a wetting agent.

LUCAS P. KYRIDES.
FERDINAND B. ZIENTY.

REFERENCES CITED

The following references are of record in the file of this patent:

UNITED STATES PATENTS

| Number | Name | Date |
|---|---|---|
| 1,953,620 | Pfaff et al. | Apr. 3, 1934 |
| 2,200,564 | Schechter | May 14, 1940 |

OTHER REFERENCES

Canadian Jour. of Research, December 1941, page 291, by Von Seemann et al.

Annalen 272, 301-303 (1892).

Lands, Proc. Soc. Exp. Biol. and Med. 57, 55-56 (1944).

Alles, J. Pharm. and Exp. Ther. 72, 265 (1941).

Whitmore, "Organic Chemistry," page 893, Van Nostrand, N. Y. 1937.

Richter, "Organic Chemistry," 649-650, John Wiley, N. Y., 1938.